Oct. 30, 1956 C. M. EDWARDS 2,769,086
DATA TRANSMISSION APPARATUS
Filed June 25, 1953
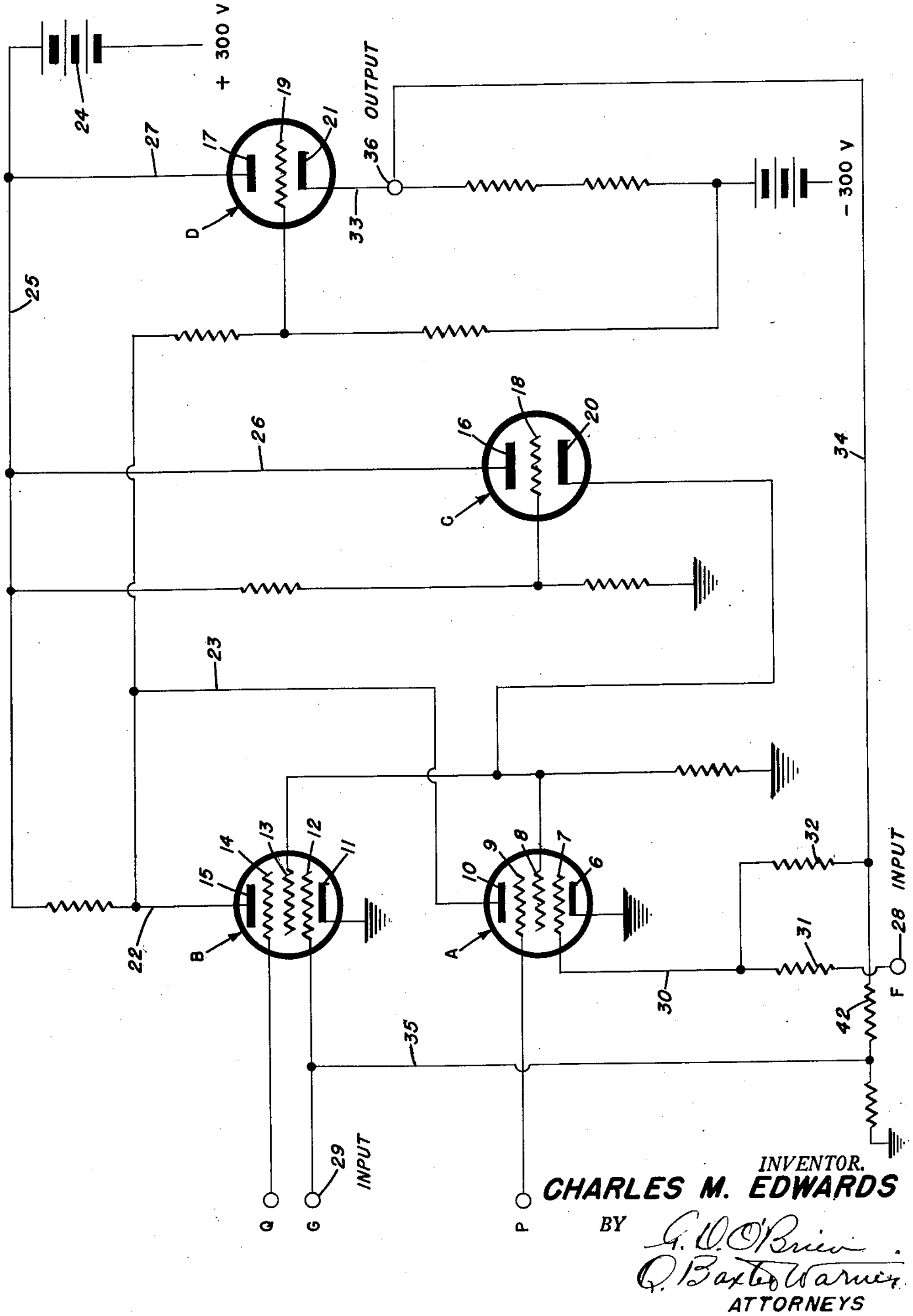
INVENTOR.
CHARLES M. EDWARDS
BY G. O. O'Brien
Q. Baxter Warner
ATTORNEYS

United States Patent Office 2,769,086

Patented Oct. 30, 1956

2,769,086

DATA TRANSMISSION APPARATUS

Charles M. Edwards, Royal Oak, Mich., assignor, by mesne assignments, to the United States of America as represented by the Secretary of the Navy Application June 25, 1953, Serial No. 364,124

4 Claims. (Cl. 250—27)

This invention relates to data transmission, and particularly to the transmission of signals for the conversion of mathematical computations from one standard to another.

In the transmission of data to digital computers operating in accordance with the binary, or "radix two" system of calculations, each digit of a number is represented by a combination of plus and minus signals, hence the transmission of the number, or its conversion to a different system of representation, involves merely the sending of plus and minus signals in the desired sequence; each digital value involving a distinctive sequence of plus and minus impulses, or of conducting and non-conducting intervals.

Heretofore the transmission of mathematical data of this character (as, for example, in digital counting by the binary method, or in converting from digital to analogue representations) has involved the use of mechanical switching apparatus for transferring the successive digits, or the successive partial products (as in step multiplication) in proper sequence, to the output or registering circuits. The present invention provides electronic switching apparatus for accomplishing the same function with greatly increased speed and accuracy.

An object of the invention, therefore, is to provide electronic switching apparatus for transferring mathematical data from one circuit to another.

A second object is to provide electronic amplification of signals being transmitted between successive computer circuits, such amplification including energy feedback operations which serve to increase the accuracy of the signal transmission.

A third object is to provide electronic signal transfer apparatus adapted to establish a power gain of preselected fractional or unity magnitude, depending upon the resistance ratio chosen for incorporation into associated feedback circuits.

A fourth object is to provide electronic signal transfer apparatus adapted to send two contrasting signal impulses from one point to another, for indicating, comparing, recording, or switching purposes.

Other objects and many of the attendant advantages of this invention will be readily appreciated as the same becomes better understood by reference to the following detailed description when considered in connection with the accompanying drawing wherein:

In the drawing numerals 6 through 10 designate the major elements of a first pentode control tube A, and numerals 11 through 15 the corresponding elements of a second control tube B. The embodiment illustrated includes two additional amplifier tubes, C and D, of the triode type, having anodes 16 and 17, control grids 18 and 19, and cathodes 20 and 21, respectively. The pentodes A and B are shown as connected in parallel branches 22 and 23 supplied from a 300-volt energy source 24, by way of supply line 25, and the plate, or anode, circuits 26 and 27 of the respective amplifier tubes are also connected to this supply line 25.

The cathodes 6 and 11 of the control tubes A and B, respectively, are connected to ground, as shown, while the control grid 7 of tube A is connected through a resistor 31 to an input terminal 28, and through a resistor 32 it has connection with the cathode circuit 33 of amplifier tube D, as does also the control grid 12 of tube B through resistor 42; the connection being by way of conductor 34 as shown, at the point 36 where cathode conductor 33 joins with the output terminal of the circuit. Conductor 34, therefore, coacts with leads 30 and 35 to serve as a means for negatively feeding back to the input tubes A and B, alternately, a portion of the energy being delivered to output circuit 33 by the final amplifier stage D.

In addition to its function as a feedback means, conductor 34 serves as an accuracy factor, in that any stray input which is allowed to pass tube A during its cutoff period is discriminated against, and does not reach the output circuit. This is an important feature, as it tends to eliminate a possible source of inaccuracies, where the apparatus is being used for data transmission, or computing.

To accomplish rapid switching as between "on" and "off" periods of data transmission, by means of control pulses (such as the "end of step" signals of a step multiplier system) the suppressor grids 9 and 14 of the tubes A and B, respectively, are utilized. Such control pulses will be applied to the signal terminals P and Q, and will determine which of the tubes A and B shall be conducting, at any instant. When no pulse is being applied, tube A is conducting, and the output energy at 36 will be of predetermined value, depending upon the resistance ratio of units 31 and 32, which ratio determines whether the amplification gain is 1/16, 1/4, 1/2 or 1. (In a complete apparatus there will be a series of circuits duplicating the one disclosed, except that each circuit will employ a different resistor couple at the points 31 and 32, to establish different gain factors in geometrical progression, corresponding to the different digital components to be represented, in accordance with conventional binary calculating methods.)

When it is desired to interrupt the energy flow from input 28 to output 36, a switching signal is applied to terminals P and Q, thus cutting off tube A and rendering tube B conductive. The cutting off of tube A disconnects source 28 from the transmitting system, thus interrupting the mathematical data transfer process. The concurrent setting up of tube B as a conductor, or the other hand (with triggering energy derived from input 29) establishes a new negative feedback path by way of conductors 34 and 35, independently of resistors 31 and 32. This new feedback path, in addition to discriminating against (and thereby blocking) any undesirable input that might stray through the now inert tube A, also performs the further desirable service of forestalling any tendency toward a sharp voltage rise at point 36, such as might otherwise occur as a result of the sudden cutting off of tube A.

This disclosed arrangement may also be used to take signals alternately from inputs at points 28 and 29 by applying a square wave at points P and Q. Such a switch could be useful in various applications as, for example, to feed two signals to an oscilloscope for comparison, or for other switching purposes.

Using the arrangement illustrated a switching speed of 3 kc. has already been obtained, and there is reason to believe that much faster switching (approaching the megacycle region) is possible by applying the disclosed teaching to apparatus constructed to more rigid manufacturing standards.

Obviously many modifications and variations of the present invention are possible in the light of the above teachings. It is therefore to be understood that within the scope of the appended claims the invention may be practiced otherwise than as specifically described.

What is claimed is:

1. An electronic switch comprising a pair of amplifier tubes connected to a common output terminal and each having at least two control grid electrodes, a separate signal input terminal connected to one control grid electrode of each of said amplifier tubes, one of said input terminals being connected through a voltage dividing network for introducing a predetermined fixed reduction in the amplification of signals applied thereto, a separate electrical switching signal terminal connected to the other control grid electrode of each of said tubes for alternating conduction between said pairs of tubes, and feedback means for coupling the common output terminal through different parts of said voltage dividing network to both of said one control grid of each of said tubes respectively so that any stray input to one of said tubes in its cut-off period does not affect the output voltage and keeps the output voltage from rising sharply during successive cut-off periods.

2. A data transmission apparatus for transferring mathematical data in the form of electrical pulses comprising first and second alternately conducting electronic valves, each valve having an anode, cathode, control grid, and suppressor grid, said anodes having a common output, each suppressor grid connected to a respective switching signal terminal, a first resistor, a first data input terminal connected through said first resistor to the control grid of said first valve, a second data input terminal connected directly to the control grid of said second valve, first and second negative feedback circuits comprising respectively second and third resistors coupled between the common output of said anodes and the control grids of said first and second valves respectively so that any output energy from said common output is of a predetermined value dependent on the ratio between said first and second resistors, said first feedback circuit serving to increase the accuracy of the data transmission, said second feedback circuit operating to block any stray input to the first valve from reaching the common output and to keep the common output from rising sharply when said first valve is suddenly cut off by reception of a switching signal from the switching terminal.

3. The data transmission apparatus for transferring mathematical data in the form of electrical pulses comprising first and second alternately conducting electronic valves, each valve having an anode, cathode, control grid, and suppressor grid, said anodes having a common output, each suppressor grid connected to switching signal terminals respectively, a first resistor, a first data input terminal connected through said first resistor to the control grid of said first valve, a second data input terminal connected directly to the control grid of said second valve, first and second negative feedback circuits comprising respectively second and third resistors coupled between the common output of said anodes and the control grids of said first and second valves respectively, data input pulses being applied to said input terminals, switching control pulses being applied to said switching terminals so that said first valve is conducting when no control pulse is present whereby any output energy from said common output is of a predetermined value depending on the ratio between said first and second resistors while said first valve is under the influence of data input pulses from the first data input terminal, and whereby upon the application of a switching signal from the switching terminals to the suppressor grids said first valve is cut off and said second valve is concurrently set up for conduction upon reception of data input pulses from said second data input terminal establishing said second feedback circuit through the third resistor independent from the first and second resistors, said second feedback circuit blocking any stray input from the first valve from reaching the common output and keeping the output energy in the common output from rising sharply when said first valve is suddenly cut off by said switching control pulses.

4. A data transmission apparatus for transferring mathematical data in the form of electrical pulses comprising first and second alternately conducting electronic valves, each valve having an anode, cathode, control grid, and suppressor grid, a third electronic valve having an anode, cathode and control grid, said anodes of said first and second valves being connected to the control grid of said third valve, a cathode load impedance connected to the cathode of said third valve, an output terminal connected to the cathode of said third valve, each suppressor grid being connected to switching signal terminals respectively, a first resistor, a first data input terminal connected through a first resistor to the control grid of said first valve, a second data input terminal connected directly to the control grid of said second valve, first and second negative feedback circuits comprising respectively second and third resistors coupled between said output terminal and the control grids of said first and second valve respectively so that any output energy from said output terminal is of a predetermined value depending on the ratio between said first and second resistors, said first feedback circuit serving to increase the accuracy of the data transmission, said second feedback circuit operating to block any stray input to the first valve from reaching the output terminal and to keep the output energy from rising sharply when said first valve is suddenly cut off.

References Cited in the file of this patent

UNITED STATES PATENTS

| | | |
|---|---|---|
| 2,482,759 | Goodrich et al. | Sept. 27, 1949 |
| 2,529,459 | Pourciau et al. | Nov. 7, 1950 |
| 2,542,160 | Stoner et al. | Feb. 20, 1951 |
| 2,615,127 | Edwards | Oct. 21, 1952 |